United States Patent [19]

Roach

[11] 4,074,831

[45] Feb. 21, 1978

[54] LIQUID METERING DEVICE WITH ADJUSTABLE STOPS

[76] Inventor: William John Roach, 12933 Lakeshore North, Auburn, Calif. 95603

[21] Appl. No.: 657,544

[22] Filed: Feb. 12, 1976

[51] Int. Cl.² .............................................. G01F 11/06
[52] U.S. Cl. ................................... 222/43; 222/309
[58] Field of Search ....................... 222/43, 44, 49, 309

[56] References Cited

U.S. PATENT DOCUMENTS

| B 497,853 | 2/1976 | Reed et al. | 222/309 X |
|---|---|---|---|
| 1,979,428 | 11/1934 | Wheeler | 222/309 |
| 3,052,376 | 9/1962 | Fogg | 222/309 X |
| 3,211,335 | 10/1965 | Shapiro | 222/309 X |
| 3,430,813 | 3/1969 | Gilmont | 222/309 X |
| 3,452,901 | 7/1969 | Roach | 222/49 |
| 3,802,608 | 4/1974 | Gullett | 222/309 |

FOREIGN PATENT DOCUMENTS

| 905,949 | 9/1962 | United Kingdom | 222/43 |

*Primary Examiner*—Robert B. Reeves
*Assistant Examiner*—David A. Scherbel
*Attorney, Agent, or Firm*—Fleit & Jacobson

[57] ABSTRACT

An apparatus for dispensing accurate volumes of liquid drawn from a reservoir to which the apparatus is attachable comprises a plunger for drawing the liquid past a non-return inlet valve into a barrel on a forward stroke of the plunger in the barrel and for expelling the liquid past a non-return delivery valve on the return stroke. The forward stroke of the plunger and hence the volume of liquid drawn in is limited by a coarse setting provided by an abutment adjustable in discrete increments along the plunger co-operating with one side of a fixed abutment on the barrel. The return stroke of the plunger, and hence the volume of liquid expelled, is limited by a vernier setting provided by a further abutment rotatable in discrete increments about the barrel and co-operating with an opposite side of the fixed abutment.

13 Claims, 10 Drawing Figures

LIQUID METERING DEVICE WITH ADJUSTABLE STOPS

The invention relates to an apparatus for accurately dispensing liquids. More particularly, the invention concerns a dispensing apparatus which is suitable for attaching to the mouth of a liquid reservoir, for example a bottle or jar, and which comprises a syringe device composed of a cylinder or barrel containing a piston or plunger. For accurately measured dispensing, the plunger is first displaced in the barrel by a predetermined amount to draw a predetermined volume of liquid from the reservoir by suction, whereupon the drawn-in liquid is ejected under pressure through a delivery tube of the syringe device by displacing the piston in the opposite direction.

A dispensing apparatus of the aforementioned kind forms the subject of my U.S. Pat. No. 3,452,901. This has proved to be a major advance in the art of such dispensers in so far that its construction permits easier dismantling by the user rather than the manufacturer. However, the advantage of easy dismantling necessitates an intricate construction resulting in comparatively expensive manufacturing costs. Also, my previously suggested dispensing apparatus cannot be readily adjusted to dispense a really precise volume of liquid selected from a wide range of volumes.

More particularly, the maximum range of volumes for my previous apparatus is limited to 9.5 ml. To obtain a larger range it would be necessary to employ a longer or wider barrel but, since the latter is disposed within the reservoir, an increase in barrel size would take up too much useful reservoir space. Even within the aforesaid limited range, it is not possible to produce changes in the volume setting smaller than about 0.2 ml. The reason for this is that the volume settings in the known apparatus are brought about by manually adjusting the position of an initially freely displaceable abutment along a scale post, and then using a set screw to fix the abutment in position. To slide the abutment to an exact location on the scale post is a difficult task to accomplish, not only because a hand is inadequately steady to effect very fine adjustments but also because there are limits to being able to discern very small spacings between adjacent graduations on the scale. This problem could be alleviated by employing a longer scale post but a correspondingly longer plunger would then be necessary and there would be difficulty in accommodating a longer barrel in standard reservoir bottles and jars; also, this solution would not resolve the problem of parallax error and the danger of causing unintentional shifting of the abutment when fixing it in position by tightening the set screw. Further, in my previous dispenser a handle provided on the plunger co-operates with the abutment to limit the stroke of the plunger. When liquid is to be drawn into the barrel, the plunger is lifted until the handle strikes the abutment. If this is done without sufficient care, the abutment is liable to become displaced on the scale post and, even with gentle operation, discernable differences in the dispensed volume of liquid are liable to occur after repeated use.

The underlying object of the present invention is to provide a liquid dispensing apparatus in which the liquid volume to be dispensed can be finely regulated and set with ease within a wide range without the danger of the set volume altering during the course of repeated operation and without necessitating a complicated and therefore expensive construction.

According to the invention, there is provided a dispensing apparatus for releasable attachment to the mouth of a liquid reservoir comprising a housing defining an inlet aperture, an outlet aperture and a proportioning aperture, said apertures being in communication with one another within said housing, means for detachably securing said housing to said reservoir so that said inlet aperture is directed into said reservoir mouth and said outlet and proportioning apertures are directed away from said reservoir mouth, a non-return inlet valve connected to said inlet aperture, a non-return delivery valve connected to said outlet aperture and syringe means in communication with said proportioning aperture, wherein said syringe means comprise an open ended stationary barrel connected to said housing over said proportioning aperture, a plunger displaceable in said barrel to suck liquid past said inlet valve through said inlet aperture and through said proportioning aperture into said barrel on a forward stroke and to discharge said liquid through said proportioning aperture and through said outlet aperture past said delivery valve on a return stroke, and control means for limiting displacement of said plunger, said control means comprising co-operating abutments associated with said plunger and barrel and means for adjusting the positions of said abutments relatively to one another in discrete increments.

By means of the invention, therefore, displacement of the plunger, of which the stroke determines the volume of liquid dispensed past the delivery valve, is controlled by co-operating abutments of which the relative positions are adjustable in discrete increments instead of continuously as hitherto. This feature is instrumental in overcoming the principal shortcoming of my aforementioned previously suggested dispensing apparatus because there is no longer a need for exercising fine control by means of the hand and eye, no matter if the capacity of the barrel and hence the available range of liquid volume settings is large. Nor does an increased range of volume settings have the previously described detrimental effect in relation to the available reservoir space because, since the inlet and proportioning apertures of the housing are directed away from the reservoir mouth, the barrel and piston are now disposed outside the reservoir instead of being suspended within same by means of a special screw-operated clamping sleeve.

A dispensing apparatus is available in Europe for which the major components are also disposed outside the reservoir to which it is attached. However, this particular known apparatus employs the conventional steplessly adjustable stop with a pointer adjacent a graduated scale. To overcome the attendant difficulties, the apparatus is made and sold in various sizes. For an apparatus with an overall volume range of, say 10 ml, the steplessly adjustable stop can be varied to produce differences of only about 0.25 ml. If manual adjustment of the stop with the aid of the naked eye is to be precise within, say as little as 0.1 ml (which is not an uncommon requirement for pipetting purposes), then the apparatus must be replaced with one that gives a capacity of only 5 ml or less. In any case, it will be appreciated that it is cumbersome and costly to keep several of the dispensing apparatuses in the laboratory. With the preferred form of the present invention, however, it is possible to provide a volume range of almost 15 ml in increments of 0.1 ml with one and the same dispensing apparatus.

In the preferred form of the invention, a first of the co-operating abutments is mounted at a fixed location on the barrel and second and third of the abutments are carried by the plunger at stepwise adjustable positions below and above the first abutment, the second abutment being adjustable lengthwise of the plunger in discrete steps providing a coarse setting for limiting the plunger displacement on its forward stroke when the second abutment meets one side of the first abutment and the third abutment being adjustable in discrete finer steps providing a vernier setting for limiting the plunger displacement on its return stroke when the third abutment meets the first abutment.

More particularly, there may be a handle on top of the plunger, a skirt depending from the handle and surrounding the barrel with clearance, the skirt containing a slot extending upwardly from its lower end, the first abutment being fixed with respect to the barrel and being disposed in the slot with a slide fit, serrations along the skirt at a predetermined pitch adjacent the slot, the second abutment being formed with complementary serrations and being engageable with the serrations on the skirt at a selected position lengthwise of the skirt below the first abutment, and means for releasably securing the second abutment to the skirt at the selected position, whereby to limit the forward plunger stroke when the second abutment meets the first abutment. If a sleeve is provided around the skirt above the level of the first abutment, the sleeve being mounted for rotation with respect to the skirt and the handle, with the upper end of the sleeve abutting the handle, then the lower end of the sleeve can be stepped to form a plurality of lands terminating at progressively increasing distances from the upper sleeve and, whereby the lower sleeve end forms the third of the abutments to limit the return plunger stroke when one of the lands in a selected rotary position of the sleeve meets the first abutment.

A graduated coarse scale in units of volume should be marked on the skirt alongside the slot in alignment with the serrations on the skirt and a pointer may be provided on the second abutment for co-operating with this scale. Similarly, a vernier scale is marked on the sleeve with graduations in alignment with the lands, and a pointer is provided on the handle for co-operating with the vernier scale. The sum of the readings on both scales will then indicate the liquid volume to which the apparatus has been set to dispense. Since it is desirable that the vernier setting should not be upset by accidental rotation of the sleeve, detent means are preferably provided for releasably holding the sleeve in its selected rotary position. The detent means may comprise the pointer on the handle, the pointer in this case being flexible and releasably engageable in one of a plurality of notches provided in the upper sleeve end.

A particular advantage presented by the present invention in comparison with my previous construction of dispensing apparatus is that, instead of requiring one long valve tube incorporating two valve seats and a transverse tubular stem between the valve seats for connection to a similar transverse tubular stem on the barrel by a special connector and spacer sleeve as well as a reduced end portion for attaching the delivery tube, this valve tube therefore being expensive to manufacture and replace when broken, two separate and relatively short non-return valves are now provided. These may be of identical construction and each comprise a tube formed with an internal constriction defining a valve seat, and a ball which rests on the valve seat and can be lifted therefrom under the action of liquid flow caused by displacement of the plunger. The lower end of the tube of the delivery valve will be connected to the outlet aperture and the upper end carries a connector for a liquid delivery tube. The delivery tube connector may include a finger which projects into the valve tube and limits the lift of the valve ball. For the inlet valve, the upper end of the valve tube will be connected to the inlet aperture and the lower end may carry a connector for a liquid inlet tube, the housing including a depending finger which projects into the valve tube and limits the lift of the valve ball.

Yet another constructional advantage of the invention is that the detachable securing means may comprise a simple internally screw-threaded ring provided with a radially inwardly directed flange at the top, and an external radially outwardly directed flange on the housing co-operating with the flange on the ring whereby, when the ring is screwed onto the neck of a reservoir and tightened, the flange on the ring clamps the flange on the housing down onto the reservoir neck. In contrast, my previous construction of dispensing apparatus necessitated an intricately formed screw-on cap which had to be precisely apertured and aligned to be in registry with apertures and projections of an inner second cap.

Apart from the advantage of providing a wider range of more positive volume settings in very fine increments, it has been found that the invention presents the opportunity of such marked overall simplification in the construction of the apparatus that the latter can now be made at practically half the cost of my previously suggested apparatus. Moreover, tests have shown that the liquid volumes are dispensed accurately and the volume settings remain tolerably constant during prolonged operation.

An example of the invention will now be described with reference to the accompanying drawings, wherein.

Figure 1:
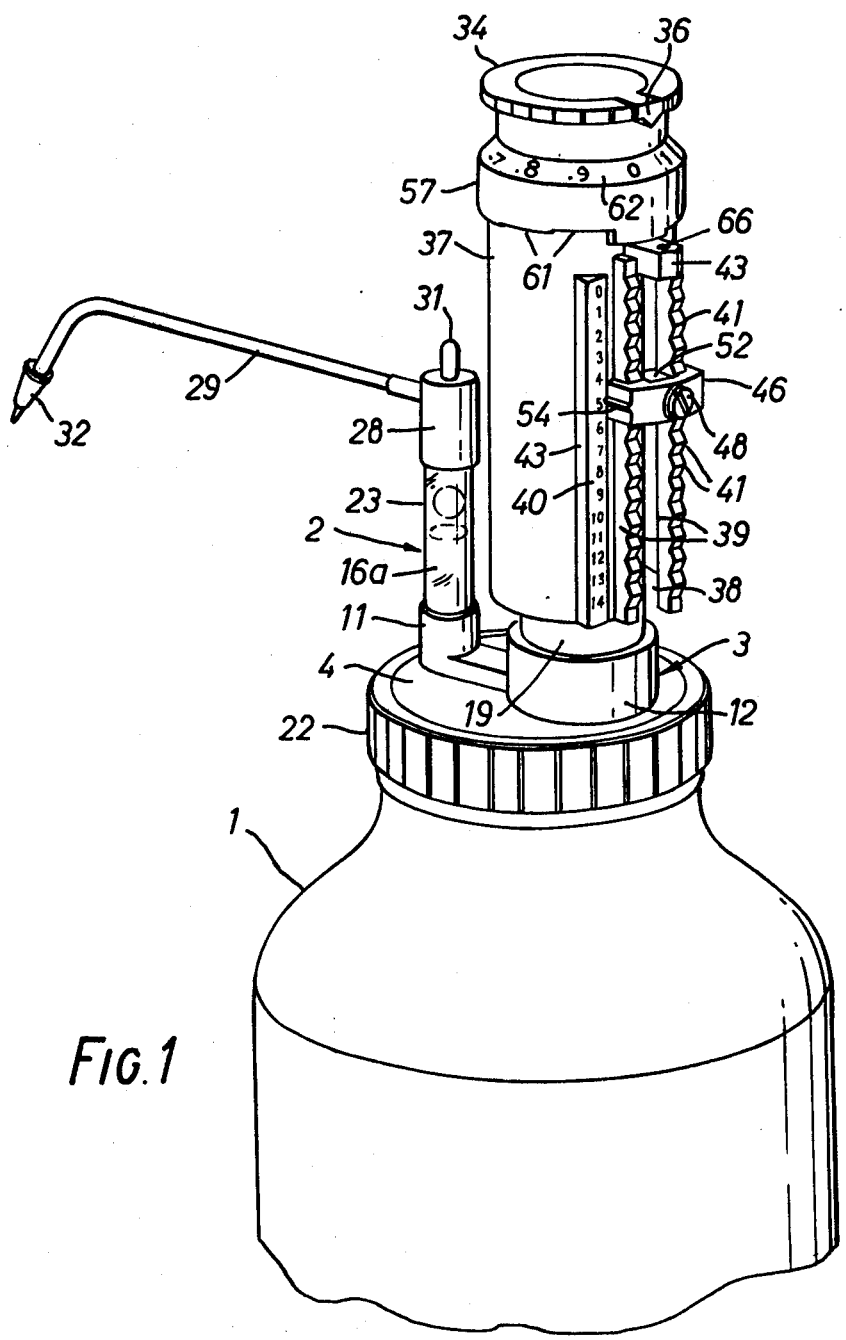
FIG. 1 is a pictorial view of a dispensing apparatus attached to a suitable reservoir.

A dispensing apparatus for liquids is shown generally at 2 in FIG. 1 as it would appear when attached to a liquid reservoir jar or bottle 1 having a mouth defined by a screw-threaded neck. The reservoir 1 may nor may not be supplied in conjunction with the apparatus 2 and has been omitted from the sectional view of FIG. 2.

The apparatus comprises a two-part housing 3 assembled from a hollow outer portion 4, which is substantially cylindrical and open at the bottom end, and a substantially cylindrical hollow inner portion 6 tightly received in the open end of the housing portion 4 up to an internal collar 7 in the latter. The top of the housing portion 4 is closed except for a liquid delivery aperture 8 and a proportioning aperture 9, each of which is surrounded by an upstanding wall defining respective sockets 11 and 12. The bottom of the housing portion 6 is open and its top is closed except for an inlet aperture for liquid defined by four holes 13 (only two are visible in FIG. 2). The inlet aperture 13 is surrounded by a cylindrical wall 14 which defines a socket for receiving a non-return inlet valve 16 up to a shoulder 17 in the wall 14. Centrally within the wall or socket 14 there is a depending finger 18 for a purpose hereinafter described.

A second non-return or delivery valve 16a is inserted in the socket 11 up to the collar 7 and an open-ended barrel or cylinder 19 is inserted in the socket 12, also up to the collar 7. Formed on the outside of the housing portion 4 there is a circumferential flange 21 by which the housing 3 is clamped to the neck of the reservoir 1 with the aid of a flanged screw-on ring 22, so that the socket 14 is directed into the mouth of the reservoir and the sockets 11 and 12 are directed upwardly away from the reservoir.

The two non-return valves 16, 16a are identical and each comprises a valve tube 23 formed with an intermediate constriction 24 defining a tapered valve seat 26 for a ball valve member 27 resting thereon. The ball member 27 can be lifted off its seat 26 under the force of liquid flowing upwardly through the valve.

Figure 9:
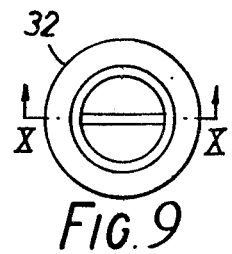
FIG. 9 is a plan view of a cap for the tip of the delivery tube.
Figure 10:
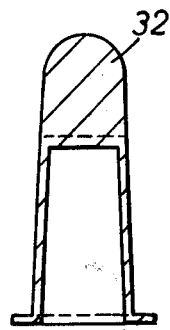
FIG. 10 is a section on the line X—X in FIG. 9.

Placed over the upper end of the valve tube 23 of the delivery valve 16a there is a connector 28 for a delivery tube 29, the connector containing a centrally depending finger 18a. The fingers 18, 18a serve to limit the lift of the ball members 27 of the respective valves 16, 16a. They could also each be used to mount a coil spring for urging the respective ball onto its seat but experiments have shown that such a coil spring is superfluous, especially for laboratory work where the reservoir 1 invariably rests on a bench and the valve tubes 23 are therefore substantially vertical. The connector 28 carries an upwardly directed projection 31. A cap 32 (FIGS. 2, 9 and 10) for the tip of the delivery tube 29 is used to seal the delivery tube, such as against the ingress of foreign matter and air when the apparatus is not in use. When the apparatus is being used, the cap 32 may be received on the projection 31 of the connector 28 to prevent it from being mislaid. The lower end of the valve tube 23 of the inlet valve 16 carries a connector 25 for an inlet tube 30 that is normally immersed in the liquid in the reservoir 1.

The aforementioned cylinder or barrel 19 fixed in the housing socket 12 forms part of syringe means and contains a reciprocatable plunger or cylinder 33 of which the top end is slightly received in a socket portion 35 of an actuating handle or knob 34. The knob contains two radially directed slots defining the flexible shank of a downwardly directed pointer 36.

Figure 3:
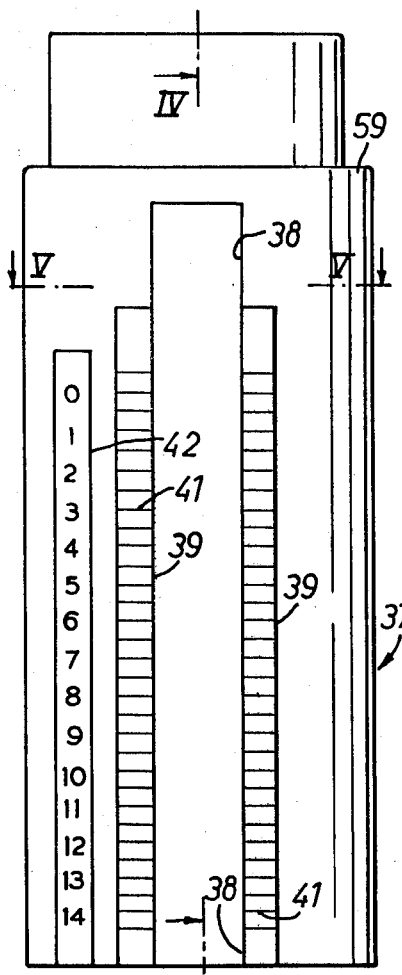
FIG. 3 is a front elevation of a skirt member employed in the FIGS. 1 and 2 apparatus.
Figure 4:
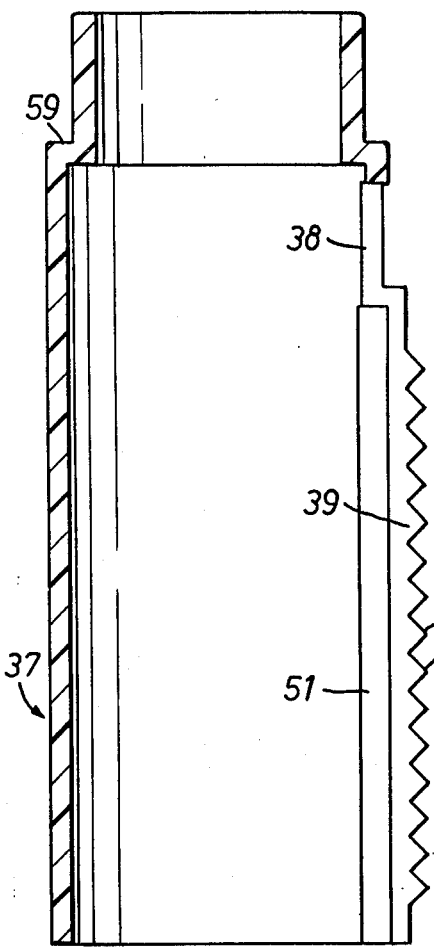
FIG. 4 is a longitudinal section on the line IV—IV in FIG. 3.
Figures 5, 6:
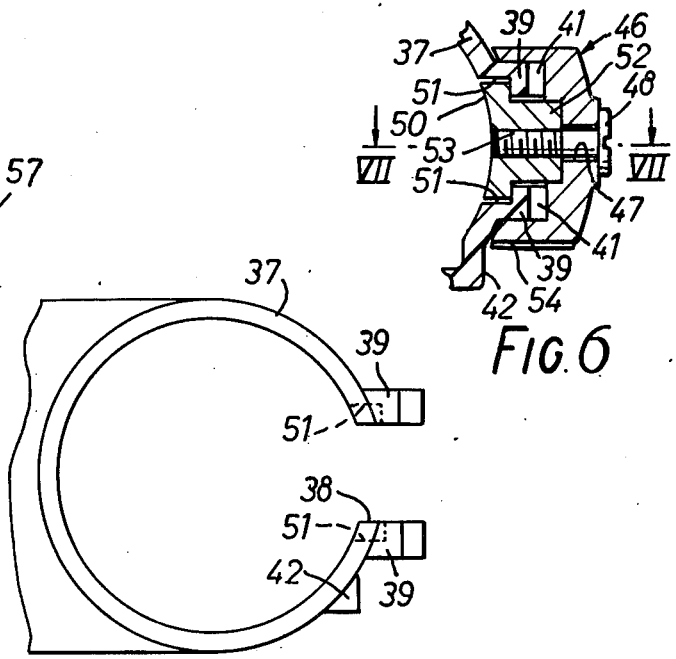
FIG. 5 is a cross-section on the line V—V in FIG. 3.
FIG. 6 is a fragmentary sectional detail of the skirt member showing an adjustable abutment secured in position.

The knob 34 is also provided with a separately fabricated skirt member 37 which is secured over the socket portion 35 and surrounds the barrel 19 with clearance. Referring particularly to FIGS. 3 to 5, the skirt member is substantially cylindrical and contains a slot 38 extending lengthwise of the skirt member from its lower end. The slot 38 is bounded by a pair of serrated ribs 39 each having 14 aligned teeth 41 and a constant predetermined pitch. Adjacent one of the serrated ribs 39 there is an unserrated further rib 42 which is marked with a scale 40. This scale identifies the teeth 41 with the consecutive numerals from 0 to 14 starting from the topmost tooth and, as will become apparent hereinafter, represents a coarse scale of graduations in units of milliliters of liquid to be dispensed with the aid of the apparatus.

Figure 7:
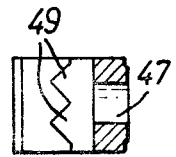
FIG. 7 is a section of the abutment taken on the line VII—VII in FIG. 6.

A projection 43 which extends radially outwardly from a ring 44 fixed at a predetermined location to the barrel 19 extends through the slot 38 in the skirt member 37 beyond the serrated ribs 39 to constitute a fixed first abutment member. The projection 43 is a slide fit between the ribs 39 so that the skirt member 37 can move up and down together with the actuating knob 34 and plunger 33. A second but adjustable abutment member 46 for co-operating with the abutment member 43 is associated with the plunger 33 by being secured to the skirt member 37 in the following manner. The abutment member 46 is in the form of a substantially U-shaped saddle (see especially FIGS. 6 and 7) of which the web is apertured at 47 to receive the shank of a machine screw 48 and the junction between each limb and the web is provided with two teeth 49 which are complementary with the teeth 41 on the ribs 39 of the skirt member. The gap between each pair of teeth 49 can thus be engaged over a selected one of the teeth 41 on the respective rib 39. On the inside of the cylindrical skirt member 37 adjacent the slot 38, there are longitudinal recesses 51 forming a slideway. Slidably received between the ribs 39 there is a clamping block 52 having lateral flanges engaged in the slideway formed by the recesses 51, as shown in FIG. 6. The block contains a tapped hole 53 in which the screw 48 can engage. The inner end of the block 52 is concave at 50 so as to be substantially flush with the inner face of the skirt member 37.

At one side of the abutment member 46 there is a rib 54 forming a pointer for co-operating with the coarse scale 40 marked on the unserrated rib 42. When each pair of teeth 49 is engaged over a respective tooth 41, the pointer 54 will be located adjacent one of the graduations of the coarse scale 40. With the screw 48 untightened (it is sufficiently long to permit the block 52 and abutment member 46 to be separated without becoming completely detached), the abutment member 46 and block 52 can together be slid lengthwise of the skirt member until the pointer 54 is adjacent a desired volume marking. The screw 48 is then tightened in the clamping block 52, whereby the abutment member is pulled up against the ribs 39 and the interengaging teeth 41, 49 positively prevent displacement from the selected setting. Upward travel of the plunger 33 in the barrel 19 is thus effectively controlled by the limit set by the abutment member 46 because the skirt member 37 travels with the plunger and, when the abutment member 46 meets the fixed abutment member 43 on the barrel 19, further plunger movement in the same direction will be prevented. The interengaging teeth 41, 49 constitute effective means for adjusting the positions of the abutments 43 and 46 relatively to each other in discrete coarse increments or steps governed by the pitch of the teeth.

Figure 8:
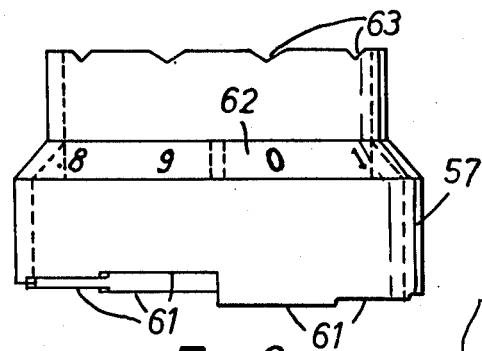
FIG. 8 is a side elevation of a sleeve used in the apparatus.

A cylindrical sleeve 57 is rotatably mounted around the skirt member 37 above the level of the fixed abutment 43. Longitudinal displacement of this sleeve is prevented firstly by an internal intermediate shoulder 58 on the sleeve lightly abutting against an external shoulder 59 formed by a reduction in the diameter at the top of the skirt member, and secondly by the upper end of the sleeve lightly abutting against the handle 34. As will be evident particularly from FIG. 8, the lower end of the sleeve 57 is stepped to form ten lands 61 terminating at progressively increasing distances from the upper sleeve end. The lower end of the sleeve 57 constitutes a third abutment member; it is associated with the plunger 33 because it moves therewith and it is adjustable in discrete steps by rotating the sleeve. Depending on the selected rotary position of the sleeve, one of the lands 61, namely the land directly over the fixed abutment 43, will meet the abutment 43 and limit the downward plunger stroke.

At a position substantially opposite the internal shoulder 58 of the sleeve 57, the latter is externally tapered and marked with a vernier scale 62 of graduations numbered from 0 to 0.9. The zero graduation is directly above that land 61 which is spaced furthest from the upper end of the sleeve, the 0.1 graduation directly above the next land, and so on, with the 0.9 marking being provided directly above the shallowest land 61. Instead of relying solely on an operator's ability to judge which marking on the vernier scale 62 is in line with the abutment 43 and the slot 38 in the skirt member 37, it is preferred to provide the aforementioned pointer 36 which is formed on the knob 34 and co-operates with the vernier scale 62. However, this pointer has a flexible shank and serves an additional function. The upper end of the sleeve 57 is provided with ten equally circumferentially spaced V notches or catches 63, one directly above each of the lands 61 at the other end and hence also directly above each graduation on the scale 62. The bottom of the pointer 36 is of V formation and serves as a latch for releasably engaging in one of the notches 63. The pointer snaps into each notch as the sleeve is rotated and is flexed out again on renewed rotation of the sleeve. The pointer 36 and notches 63 therefore form detent means for releasably holding the sleeve in a selected rotary position.

The preferred materials employed for the various major components of the apparatus are ceramic for the valve balls 27, polypropylene for the screw-on ring 22, connectors 25, 28, plunger knob 34, ring 44 with abutment member 43, tip cap 32 and both portions 4, 6 of housing 3, glass for the valve tubes 23 and plunger 33 and a high strength and dimensionally stable thermoplastic material such as Valox for the skirt member 37, sleeve 57, abutment member 46 and clamping block 52. All components coming into contact with the liquid being dispensed should of course be of inert material.

To assemble the apparatus in the factory, the ring 44 carrying the abutment 43 is first shrunk onto the barrel 19. This can be done by immersing the ring 44 in boiling water to soften it and forcing it over the barrel to a predetermined position. In the cool condition, the ring and barrel are an interference fit. Similarly, the knob 34 is shrunk onto the top of the plunger 33. Next, the sleeve 57 is located over the top of the skirt member 37 and the latter is forced over the portion 35 of the knob 34 in a relative rotary position so that the slot 38 is directly in line with the pointer 36. The barrel 19 having the ring 44 already secured to it is now anchored in the socket 12 in a rotary position so that the abutment 43 points away from the socket 11. The plunger can at any time be engaged in the cylinder with the abutment 43 entering the slot 38 in the skirt member 37. After the housing portion 6 has been assembled with the portion 4, the inlet valve 16 is placed in the socket 14 and the delivery valve in the socket 11. The connectors 25 and 28 are then placed on the respective valves for connecting the inlet and outlet tubes 30, 29 respectively. The abutment member 46 is finally screwed to the clamping block.

The assembled apparatus needs to be calibrated because it is uneconomical to manufacture all the components to within extremely close tolerances. Such calibration is effected at the zero volume settings of both the adjustable abutments. Accordingly, the sleeve 57 is rotated until the pointer 36 indicates 0 on the vernier scale 62. The abutment 46 is then engaged over the uppermost tooth 41 of the skirt, when pointer 54 will indicate 0 on the coarse scale 40. During assembly, the ring 44 was positioned on the barrel 19 so that at this stage, i.e. prior to actual calibration, slight vertical movement of the plunger 33 is possible in an upward direction at these zero settings. A vertically disposed set screw or calibrating screw 64 engaged in a tapped hole 66 and forming part of the abutment 43 is now turned to project downwardly until it just touches the top of the abutment 46, whereby vertical movement of the plunger will no longer be possible at the zero settings.

The apparatus is now ready for use. It will be appreciated that volume settings are possible by means of the abutment 46 in coarse increments of 1 ml (as determined by the pitch of the teeth 41) and by the abutment formed by the lower end of the sleeve 57 in fine or vernier increments of 0.1 ml (as determined by the differences in the levels of the lands 61). The sleeve 57 co-operates with the top of the fixed abutment 43 to limit the downward stroke of the plunger and the abutment 46 co-operates with the underside of the abutment 43, or rather the calibrating screw 64 thereof, to limit the upward stroke of the plunger. The coarse and vernier volume settings are cumulative.

Figure 2:
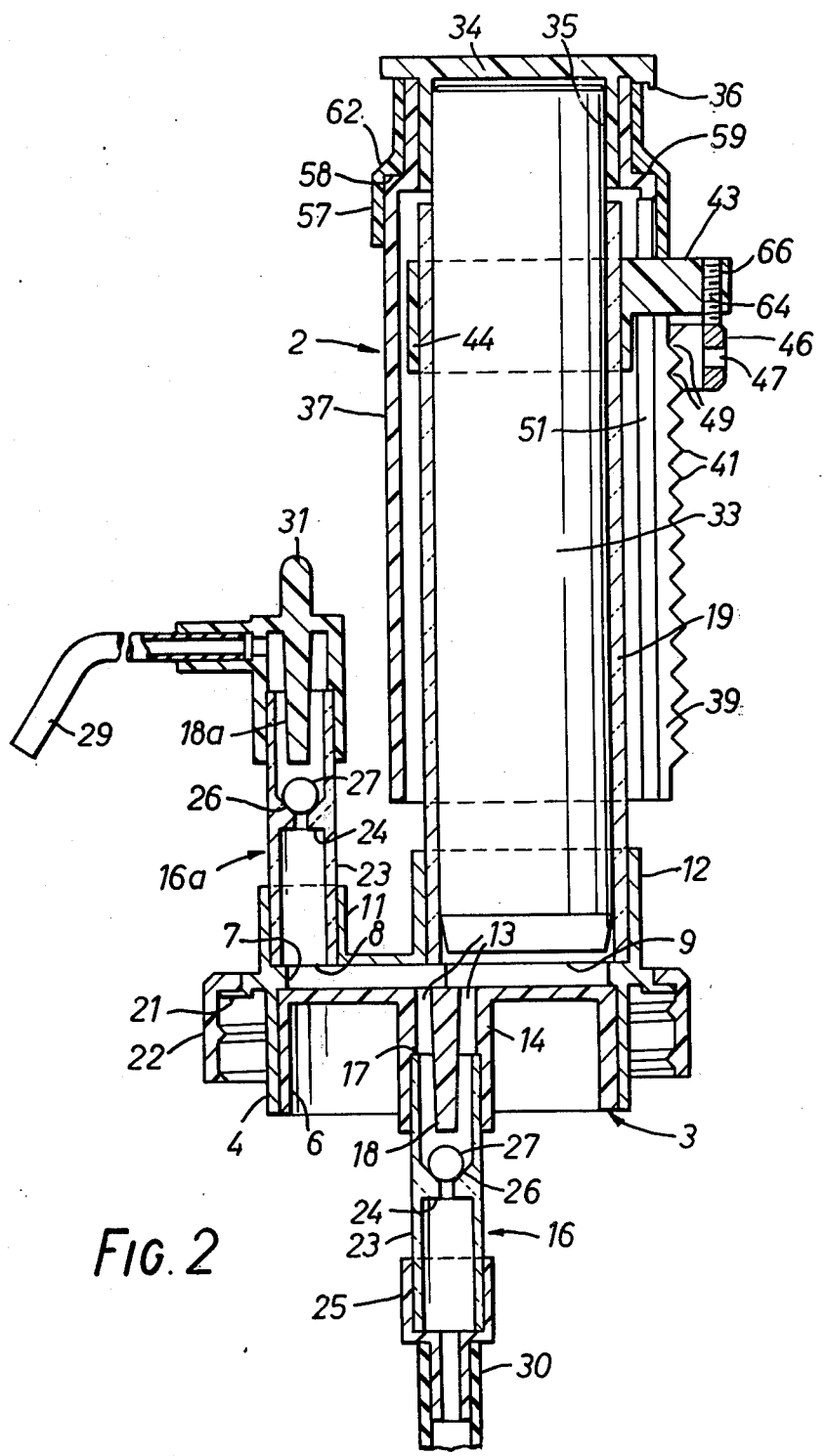
FIG. 2 is a fragmentary sectional side elevation of the FIG. 1 apparatus.

Liquid is drawn from the reservoir 1 through the inlet tube 30, inlet valve 16, inlet aperture 13, proportioning aperture 9 and into the barrel 19 by lifting the plunger 33 with the aid of the knob 34 until the abutment 46 meets the calibrating screw 64. In FIG. 2, the abutment 46 is positioned adjacent the screw 64, and upward movement cannot occur. During this time, the ceramic ball 27 of the inlet valve 16 is lifted off its seat 26 but, since the liquid enters the barrel 19, the delivery valve 16a remains closed. On the return stroke of the plunger, the drawn-in liquid is expelled past the valve 16a under pressure, and this pressure keeps the inlet valve 16 closed. The return stroke of the plunger is limited by the sleeve 57 when the appropriate land 61 meets the top of the abutment 43.

It will be noted that the plunger 33 and the components that are carried thereby can be readily removed for cleaning and that this does not upset the zero calibration.

I claim:

1. Dispensing apparatus for releasable attachment to the mouth of a liquid reservoir comprising a housing defining an inlet aperture, an outlet aperture and a proportioning aperture, said apertures being in communication with one another within said housing, means for securing said housing to said reservoir so that said inlet aperture is directed into said reservoir mouth and said outlet and proportioning apertures are directed away from said reservoir mouth, a non-return inlet valve connected to said inlet aperture, a non-return delivery valve connected to said outlet aperture and syringe means in communication with said proportioning aperture, wherein said syringe means comprise an open-ended stationary barrel connected to said housing over said proportioning aperture, a plunger displaceable in said barrel to draw liquid past said inlet valve through said inlet aperture and through said proportioning aperture into said barrel on a forward stroke and to discharge said liquid through said proportioning aperture and through said outlet aperture past said delivery valve on a return stroke, and control means for limiting displacement of said plunger, said control means comprising co-operating abutments associated with said plunger and barrel, wherein said abutments comprise two adjustable abutments, means for adjusting one of said adjustable abutments to change the length of stroke of the plunger in discrete steps for providing a coarse setting, and means for adjusting the other of said adjustable abutments to change the length of stroke of the plunger in discrete finer steps for providing a fine setting.

2. Apparatus according to claim 1, wherein said co-operating abutments comprise a first abutment mounted at a fixed location on said barrel and said adjustable abutments comprise second and third abutments carried by said plunger at stepwise adjustable positions at opposite sides of said first abutment, said second abutment being adjustable to change the length of stroke of said plunger in discrete steps providing a coarse setting for limiting said plunger displacement on its stroke in one direction when said second abutment meets one said of said first abutment and said third abutment being adjustable to change the length of stroke of the plunger in discrete finer steps providing a fine setting for limiting said plunger displacement on its stroke in the opposite direction when said third abutment meets said first abutment.

3. Apparatus according to claim 1 including an actuating handle on the top of said plunger, a skirt depending from said handle and surrounding said barrel with clearance, said skirt containing a slot extending upwardly from its lower end, a first of said abutments being fixed with respect to said barrel and being disposed in said slot with a slide fit, serrations along said skirt at a predetermined pitch adjacent said slot, a second of said abutments being formed with complementary serrations and being engageable with said serrations on the skirt at a selected position lengthwise of said skirt below said first abutment, and means for releasably securing said second abutment to the skirt at said selected position, whereby to limit said forward plunger stroke when said second abutment meets said first abutment.

4. Apparatus according to claim 3 including a sleeve around said skirt above the level of said first abutment, said sleeve being mounted for rotation with respect to said skirt and said handle with the upper end of the sleeve abutting said handle, wherein the lower end of said sleeve is stepped to form a plurality of lands terminating at progressively increasing distances from said upper sleeve end, wherein said lower sleeve end forms a third of said abutments to limit the return plunger stroke when one of said lands in a selected rotary position of said sleeve meets said first abutment.

5. Apparatus according to claim 4, wherein a vernier scale is marked on said sleeve with graduations in alignment with said lands, and a pointer is provided on said handle for co-operating with said vernier scale.

6. Apparatus according to claim 5 including detent means for releasably holding said sleeve in its selected rotary position.

7. Apparatus according to claim 6, wherein said detent means comprise a flexible said pointer on said handle releasably engaging in one of a plurality of notches provided in said upper sleeve end.

8. Apparatus according to claim 3, wherein a graduated coarse scale in units of volume is marked on said skirt alongside said slot in alignment with said serrations on said skirt and a pointer is provided on said second abutment for co-operating with said scale.

9. Apparatus according to claim 1, wherein said non-return valves are of identical construction and each comprises a tube formed with an internal constriction defining a valve seat, and a ball which rests on said valve seat and can be lifted therefrom under the action of liquid flow caused by displacement of said plunger.

10. Apparatus according to claim 9, wherein a lower end of said tube of said delivery valve is connected to said outlet aperture and the upper end carries a connector for a liquid delivery tube.

11. Apparatus according to claim 10, wherein said delivery tube connector includes a finger which projects into said valve tube and limits the lift of said valve ball.

12. Apparatus according to claim 9, wherein an upper end of said tube of said inlet valve is connected to said inlet aperture and the lower end carries a connector for a liquid inlet tube, said housing including a depending finger which projects into said valve tube and limits the lift of said valve ball.

13. Apparatus according to claim 1, wherein said securing means comprise an internally screw-threaded ring provided with a radially inwardly directed flange at the top, and an external radially outwardly directed flange on said housing co-operating with said flange on said ring whereby, when said ring is screwed onto the neck of a reservoir and tightened, said flange on said ring clamps said flange on said housing down onto said reservoir neck.

* * * * *